Patented Mar. 2, 1954

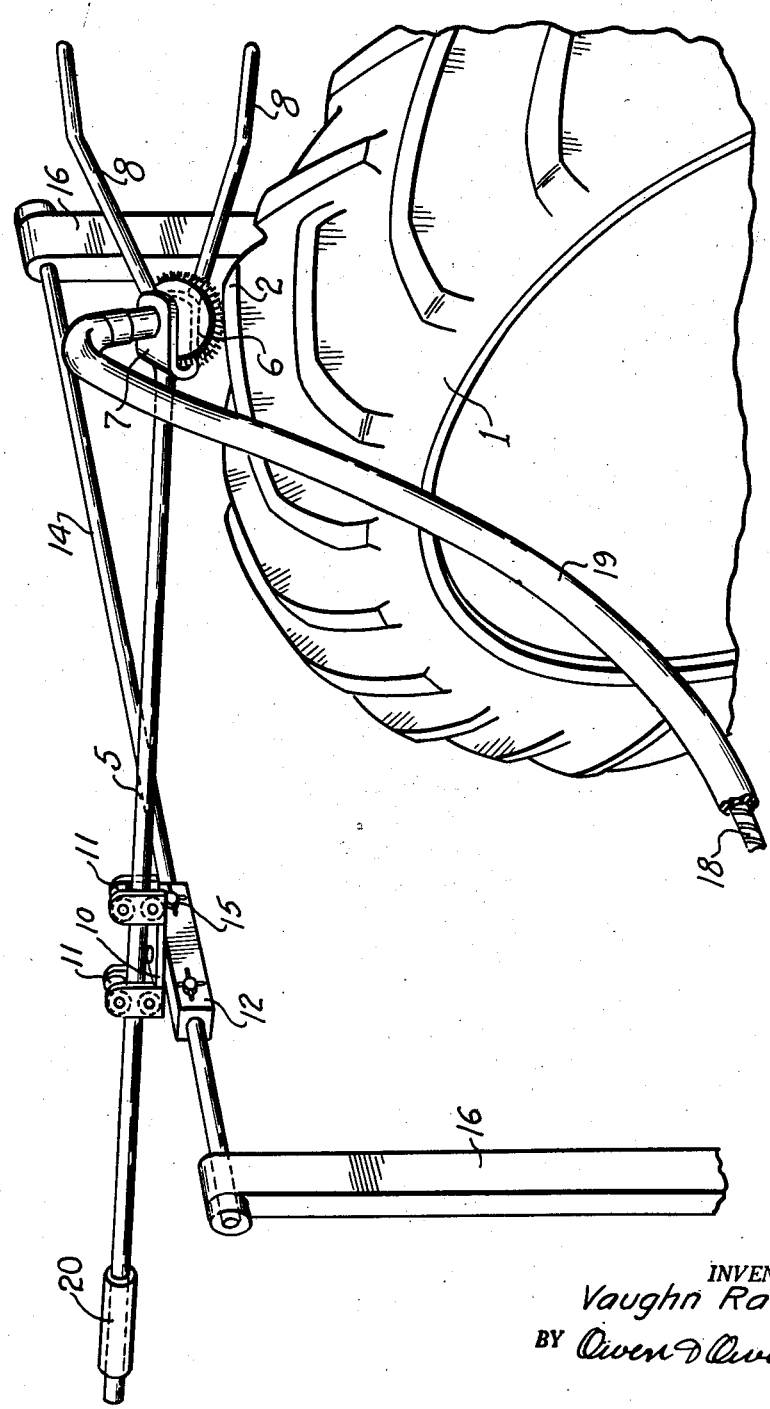

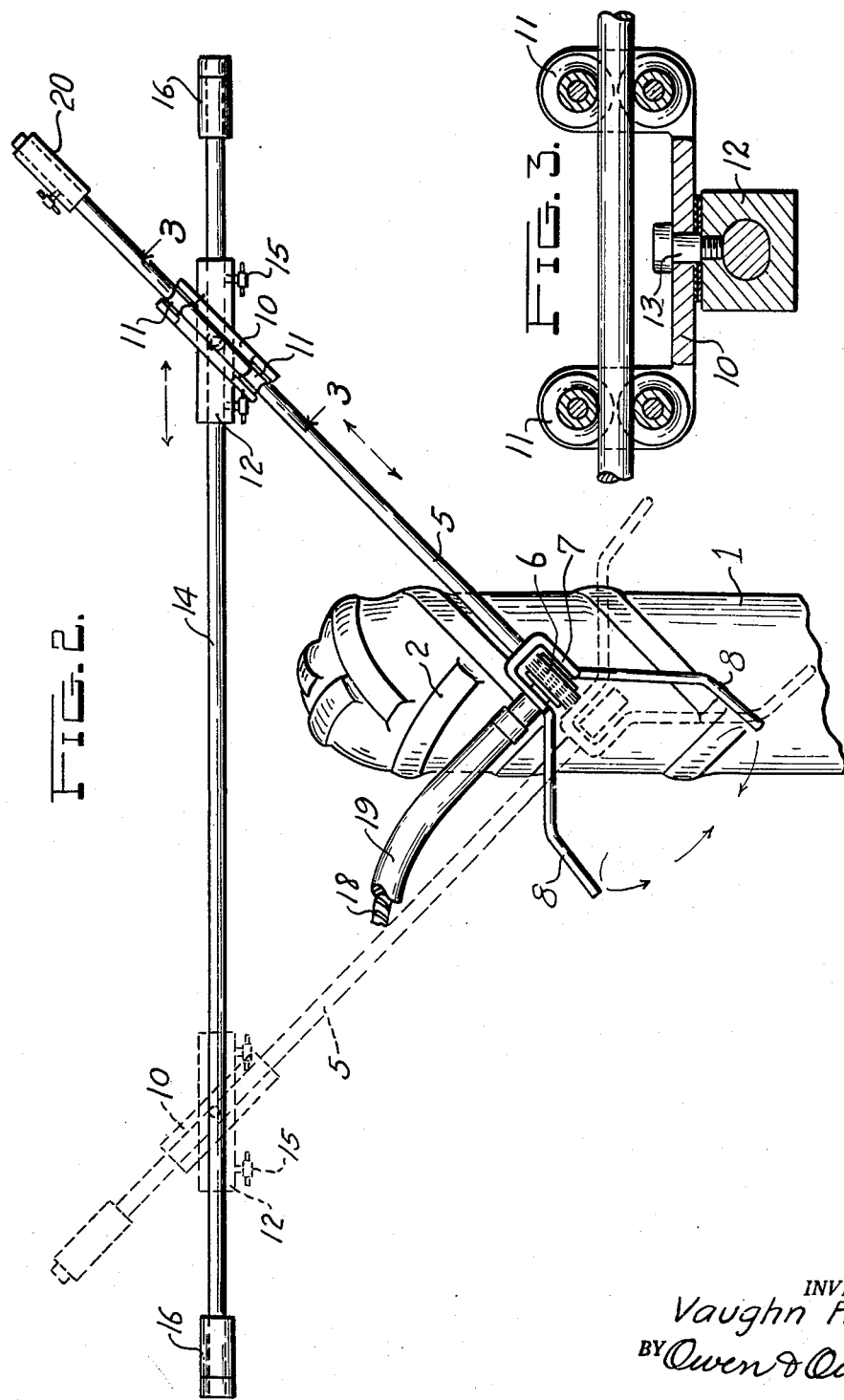

2,670,526

UNITED STATES PATENT OFFICE 2,670,526

TIRE LUG BUFFER

Vaughn Rawls, Lima, Ohio, assignor to American Tire Machinery, Inc., Muncie, Ind., a corporation of California Application November 6, 1948, Serial No. 58,676

3 Claims. (Cl. 29—76)

This invention relates to tire repair equipment, and particularly to an apparatus for buffing worn lugs on heavy duty tires to sharpen their edges and to restore their effective gripping or antislipping action.

It is common in heavy duty tires, such for instance as used on tractors, to provide the tire treads with heavy cross-lugs usually disposed in diagonal relation to the tread periphery and in double circumferentially extending sets with the lugs of one set alternating with and in substantially right angular relation to those of the other set. These lugs in use become badly worn and their edges rounded, particularly at the center portion of the tread, so that their effective antiskidding quality is greatly reduced.

The object of the invention is the provision of a simple and efficient apparatus that is easily operable to buff tire lugs lengthwise thereof so as to renew the effective anti-skid characteristics thereof.

Further objects of the invention will be apparent from the following detailed description, and from the accompanying drawings illustrating one embodiment thereof, in which—

Fig. 1 is a perspective view of an apparatus embodying the invention, together with an associated tire, and with the buffing wheel in operative engagement with the side of a tire lug; Fig. 2 is a top plan view thereof, with the buffing means shown in full lines in buffing engagement with a lug at one side of the tire tread, and shown in dotted lines in buffing engagement with a lug at the opposite side of the tread, and Fig. 3 is an enlarged section on the line 3—3 in Fig. 2.

Referring to the drawings, I designates a heavy duty tire and 2 the anti-skid lugs thereon. These lugs, in the present instance, are arranged in two circumferentially extending sets, with the lugs of each set diagonally disposed and alternating with the lugs of the other set in angularly disposed relation thereto. The reconditioning of these lugs is accomplished by passing a buffing tool along the sides of the lugs so as to sharpen their edges.

The tool employed for this purpose and embodying the invention includes an arm 5, in the present instance of rod-form, that carries a buffing wheel 6 at one end and is mounted and guided to have longitudinal reciprocatory and universal rocking and lateral swinging movements necessary to cause the buffer to follow the contour of any lug on a tire being acted on. In the present instance, one end of the arm 5 is provided with a fork 7 within which the buffing wheel 6 is journaled, and each fork arm has a handle bar 8 projecting therefrom in diverging relation to the other bar so that an operator may grasp the handle bars with both hands and control the movements of the buffing arm 5 during a buffing operation.

The arm 5 is carried for its various movements by a carriage 10 having two sets of rollers 11 receiving the arm and guiding it for free longitudinal reciprocatory movements as well as for rotation about its own axis. The carriage is itself mounted on or attached to a block 12 for swivel movements relative thereto on a pivot 13, the axis of which is normal to that of the arm 5. The block 12 is mounted for sliding movements lengthwise of a guide rail 14 and is secured in adjusted position thereon by hand screws 15.

The bar 14 is journaled at its ends for rocking movements in spaced supports or uprights 16. The tire I is suitably supported in upright position substantially midway of the supports 16 at one side of the bar 14 and preferably with its top substantially on a level with the bar so that in operation the bar and buffer may be moved in a generally horizontal direction. The bar may, however, be above or below the tire top, if desired. In use, the carriage block 12 is so positioned on the bar 14 that when the buffing wheel 6 is over the tire its carrying arm 5 is substantially parallel to the lug 2 it is intended to buff, as shown in Fig. 2. When a lug 2 at the opposite portion of the tire tread is to be acted on, it is necessary to shift the carriage block 12 to a position at the opposite end portion of the bar 14 so that the arm 5 will be substantially parallel to the lug to be acted on at that side of the tire tread, as shown by dotted lines in Fig. 2.

The buffing wheel 6 is driven from any suitable power source by a flexible shaft 18 disposed within a flexible tubular sheath or casing 19. A stop collar 20 on the free end of the buffer arm 5 coacts with the carriage to prevent withdrawal of the arm therefrom.

In the use of the apparatus, a tire to be operated on is mounted in upright position on a suitable supporting rack (not shown), with its top edge preferably substantially on a level with the guide rail 14. The carriage block 12 is then secured by the screws 15 in position on the bar so that the longitudinal axis of the buffer arm 5 is substantially parallel to the tread lug 2 to be buffed and with the buffer wheel over the tire. The operator then, by control of the buffer arm movements through the handles 8, directs the buffing course of the wheel 6 along first one side of the lug 2 and then the other to trim its sides and sharpen its edge angles. When the buffing of one lug has been completed, the tire is shifted to bring another lug in order in substantially parallel relation to the arm 5 and the lug buffing operation then repeated. When all the lugs at one side of the tire tread have been buffed, the screws 15 in the carriage block 12 are loosened and the carriage then shifted to the other end portion of the guide rail 14 and secured in position for the buffer arm to substantially parallel a lug 2 on the adjacent side portion of the tread, as shown by dotted lines in Fig. 2. The buffing operations are repeated for each lug at such side of the tire tread the same as before.

It is apparent that with this apparatus, the worn heavy duty lugs on a tractor tire or the like may be easily and quickly reconditioned with little effort on the part of the operator, and that while it is preferable to position a lug to be treated in substantial parallelism with the axial movements of the buffer arm, the universal mounting of the buffer arm carriage permits free movement of the arm in any direction so that lugs out-of-parallel with the arm axis may be freely buffed. For the purpose of such movements, the buffing wheel may be moved lengthwise of the carrying arm axis, rotatably of such axis, about the carriage pivot 13, and about the axis of the guide rail 14.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In an apparatus for reconditioning the worn lugs of heavy duty tires, a rocker member, a manually movable arm, a buffing wheel carried by said arm, and means guiding said arm for both rotary and axial movements on its longitudinal axis, said means being pivoted to said member for rocking movements on an axis perpendicular to the longitudinal axis of said arm.

2. In an apparatus for buffing the worn lugs of heavy duty tires, a guide rail extending generally parallel to the axis of a tire being treated and adjacent to its tread, a member shiftable on said rail to one side or the other of an associated tire and rockable about the rail axis, a carriage pivoted to said member on an axis transverse to that of said rail, an arm carried by said carriage and guided thereby for both rotary and axial movements on its longitudinal axis, and a power driven buffing wheel carried by the arm for rotation on an axis perpendicular to the longitudinal axis of said arm.

3. In an apparatus for buffing the worn lugs of heavy duty tires, a guide rail, a member shiftable to different positions on the rail and rockable about the rail axis, a carriage mounted on the member for rocking movements about an axis transverse to the rail axis, an arm of bar form, mounted on and guided for longitudinal reciprocatory and transverse rotary movements by said carriage, a buffing wheel journaled in the arm adjacent one end thereof and movable lengthwise of an associated tire lug by axial movements of the arm, said arm during operation being disposed diagonally to the axis of a tire being treated with its longitudinal axis substantially parallel to a lug being acted on.

VAUGHN RAWLS.

References Cited in the file of this patent

UNITED STATES PATENTS

| Number | Name | Date |
|---|---|---|
| 2,027,490 | Pendleton et al. | Jan. 14, 1936 |
| 2,073,400 | Cumming | Mar. 9, 1937 |
| 2,409,340 | Bohler | Oct. 15, 1946 |

FOREIGN PATENTS

| Number | Country | Date |
|---|---|---|
| 403,459 | Great Britain | Dec. 28, 1933 |
| 561,879 | Germany | Oct. 19, 1932 |